MOSES T. RIDOUT.
Improvement in Grain Binders.

No. 120,828.    Patented Nov. 14, 1871.

Witnesses.    Inventor.

MOSES T. RIDOUT.
Improvement in Grain Binders.

No. 120,828.  Patented Nov. 14, 1871.

Witnesses.  Inventor.

MOSES T. RIDOUT.
Improvement in Grain Binders.
No. 120,828.           Patented Nov. 14, 1871.
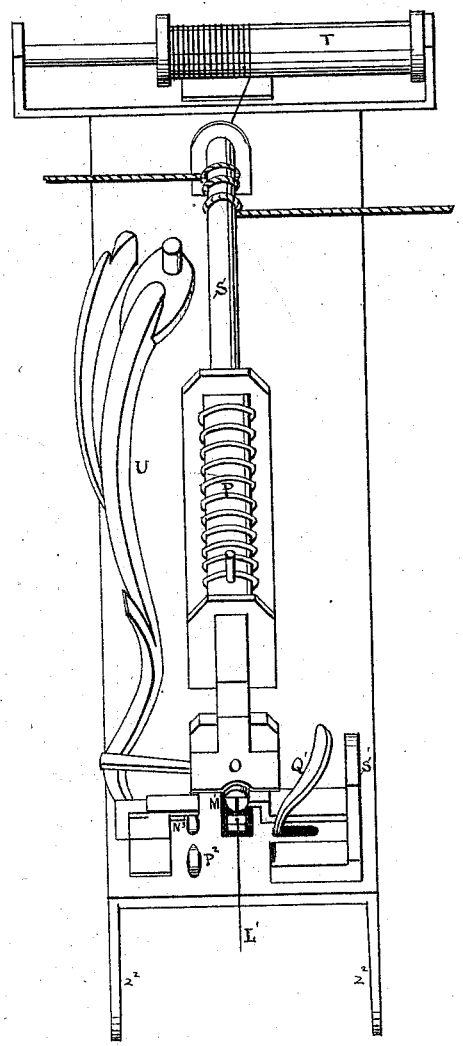
Witnesses.
Inventor.
Moses T. Ridout 120,828

UNITED STATES PATENT OFFICE.

MOSES T. RIDOUT, OF SUN PRAIRIE, WISCONSIN, ASSIGNOR TO HIMSELF AND JOSEPH H. MANN, OF SAME PLACE.

IMPROVEMENT IN GRAIN-BINDERS.

Specification forming part of Letters Patent No. 120,828, dated November 14, 1871.

*To all whom it may concern:*

Be it known that I, MOSES T. RIDOUT, of Sun Prairie, in the county of Dane in the State of Wisconsin, have invented certain Improvements in Grain-Binders, of which the following is a specification:

My invention is a grain-binder, to be run independent and separate from the harvester, and is a combination of machinery, consisting of wheels, teeth, and levers for gathering up the grain after it is cut and lies on the ground, and binding apparatus to bind the grain after it is gathered up, and casting it, after it is bound, off onto the ground in bound sheafs enough to form a shock.

Figure 1:
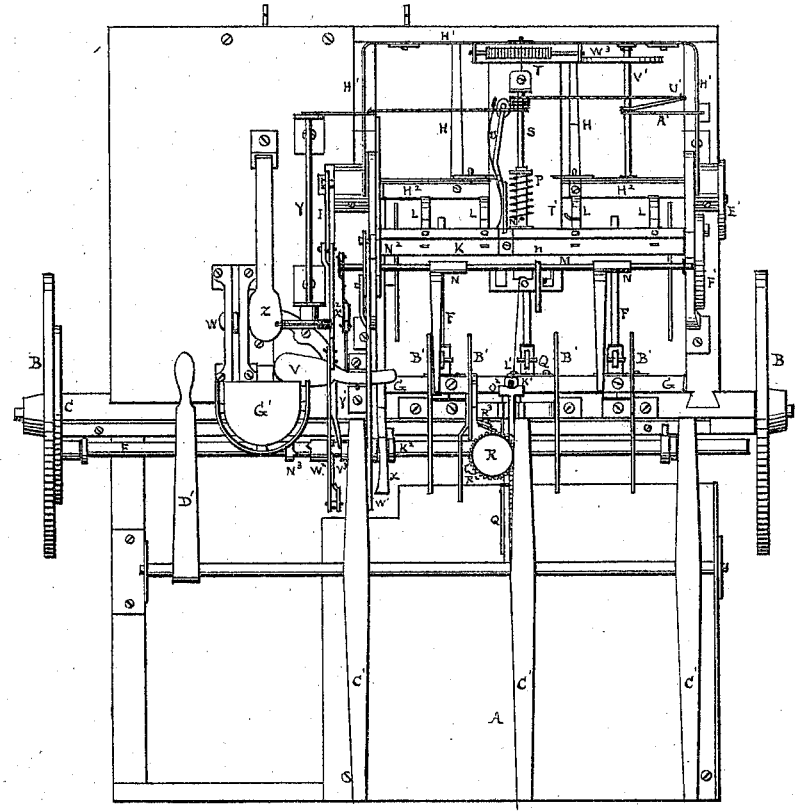
Figure 2:
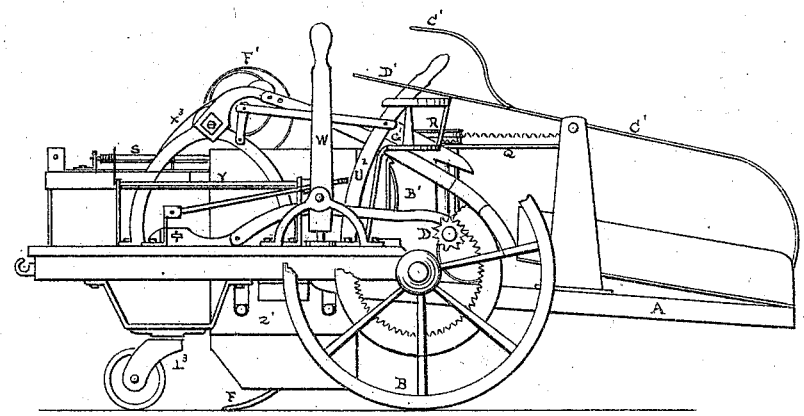
Figure 3:
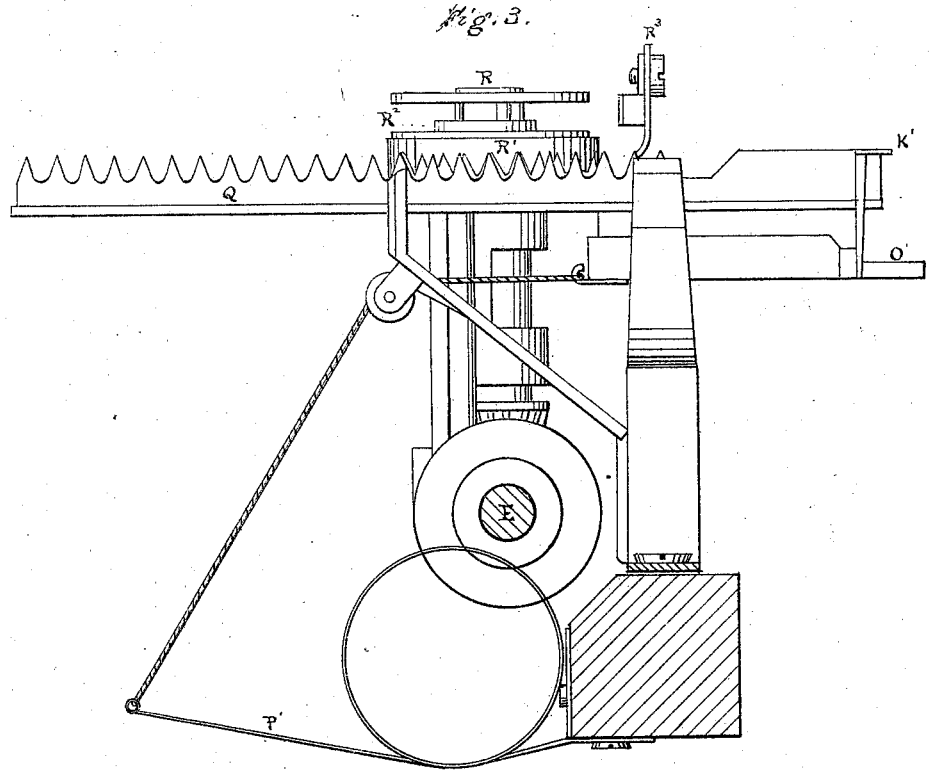
Figure 5:
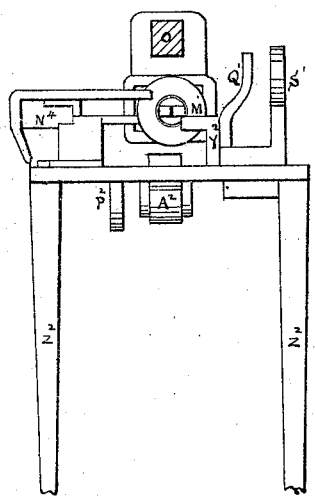

Figure 1 is a plan view of the binder. Fig. 2 is a side view of same; Fig. 3, a sectional view of the apparatus, which moves up when the grain is collected into a bundle, and carries the wire round it to the twister; Fig. 4, sectional view of the twisting apparatus; and Fig. 5, an end view of the twister.

A is the frame of the binder; B, the wheels, on which the frame rests; C, a rim, cogged on the inside and attached to one of the driving-wheels; D, a pinion on the end of a shaft, E, which shaft extends across the binder, and the pinion D meshes into the cogs on rim C, so that as the wheel moves pinion D and shaft E revolve; F, teeth inserted in sockets. These teeth are curved, and their lower ends just clear the ground and pass along and gather up the grain. They stand loose in the sockets, which are attached to a shaft, G, which is hinged to frame A. If these teeth strike anything they rise up in the sockets, and after they pass the obstruction fall back again; and the shaft, being hinged to frame A, can be turned and raise the points of the teeth so as to pass over anything without raking. H, another set of teeth, hung on a rolling shaft, H'', which is above teeth F, and teeth H are crooked in an opposite direction, so that as the shaft H'' is rocked the teeth H are raised in an opposite direction to the hook of teeth F, and the grain which teeth F has gathered is taken from them onto teeth H and raised up to a level position; L, teeth on a rolling shaft, K, which, as the shaft K is rolled, raises the teeth L, which are curved and raised in the same direction as teeth A, takes the grain from teeth H and raises it up, and with it the binding-wire L', which is drawn across over the space and holds it there till the wire is carried round the grain and it is bound; M, rolling-shaft, on which are teeth N, which, when the grain is bound by rolling-shaft M, the teeth N catch under the bundle and throw it over onto the platform out of the way. These several shafts H'', K, and M are hung in suitable bearings. O, a yielding piece on the top of the twister, its end notched for the wire to fall into or catch into as it is raised by the grain on teeth L; P, a spiral spring, which holds piece O out to its place; Q, rack; O', jaws, which hold the end of the binding-wire; K', a piece on the top of rack Q, with a notch in its end similar to that in piece O, and as the ratchet Q is thrown forward the wire is taken in the notch of K' and carried forward under the bundle of grain which lies on teeth L and under piece O, and this piece K' and piece O holds the wire round the bundle firmly till twister-jaws M' seizes both parts of the wire; R, top of a standard or upright shaft, which has a pinion on its lower end meshing into a cog-wheel on shaft E, and on which is a loose pinion, R', which is operated by a shifter, R'', which is fastened to R', and is thrown into gear with a couple of pins on R by one of the teeth L striking stop R'''' and forcing it up so that shaft R'' strikes it, when the pinion will turn, and, meshing into cogs on rack Q, carries it forward till the shifter R'' is thrown out of gear, when the rack Q will stop; R''', stop attached to the frame A, which shifter R'' strikes when it comes round to it, and pinion R' is thrown out of gear; S, twister-shaft; M', jaws of the twister, which seize hold of wire L' and twist it when the wire is carried round the bundle and forced into it by rack Q; Q', a spring-stop, which holds rack Q up when it is thrown forward, and is released by lever G', when rack Q falls back and is caught by spring-stop S. This makes O and K' release their hold on the wire, and when the shaft K and teeth are thrown forward the bundle is thrown over onto the platform, and as shaft M and teeth N are thrown back, after having thrown the bundle over stop L'' on one of the teeth N, strikes spring-stop S' and releases rack Q, spring P' throws rack Q back to its original position. The knife N'''' is set open, and held so by spring-stop P'', and as the rack Q is thrown forward the bottom part of K' strikes this spring-stop P'' and releases the knife, and spring U attached to the knife N'''' throws it forward, and its edge striking the wire between the edge of the knife and block Y'' cuts it and leaves it for the twister-jaws M' to be turned and twist it; and as shaft K is turned back lever N' on shaft K strikes behind knife-spring U and sets the knife back again ready for the next movement of rack Q. T, the spool on which the wire is wound; Z, treadle, to which is attached a cord, which is attached to a wheel on a shaft, Y, so that by putting the foot on this treadle and bearing down this shaft will be turned and turn up a lever on its other end, to which is attached a cord, which, passing round twister-shaft S, and the other end attached to lever U'. Said lever U', the inner end of which is attached to shaft V', which shaft V' is hung in boxes and turns when the cord is pulled, and falls back to its original position when released by means of spring V'''', lever A' on shaft V' striking on frame H' prevents shaft V' from turning too far back. This is the arrangement for twisting the wire by pressing treadle Z and binding the bundle. A'' is a tension-wheel with a hole through it, through which passes wire L', and by turning it forward or backward a greater or less tension is produced. V is a treadle to raise teeth F whenever it is necessary; V'', bracket on frame A, through which shaft E works and has a bearing. This bracket forms a stop, against which an arm, X, works. This arm X is wider at its end than at any other part, the back side made straight, and slipping as it moves back and forth against bracket V''. This arm, at its end, is made crotched, one fork or crotch slipping above shaft E and the other below, and as it is made wedging, the thickest part of the wedge at the extreme end of X, as it is hauled back it strikes sleeve W', to which is attached arm X''. This is a loose sleeve on shaft E, and forces it against stop V''', which is fastened to shaft E firmly; and there being cogs on sleeve W', and stop V''' made wedging or V-shaped, as the shaft E moves the sleeve will move with it; and on one side of sleeve W' is a ridge with a slot through it, and when the shaft E has turned far enough a bracket, which is fastened to frame A and which holds sleeve W' up to stop V'''', will pass through the slot, or the sleeve W' will pass over the bracket and come out of gear with the stop V'''. Lever W being taken hold of first, and by its means lever Y', throws up sleeve W'' (which is a sleeve made and operating the same as sleeve W') against collar N''', which is on shaft E, and the teeth on the collar and sleeve, which are made V-fashion, interlocking, turn the sleeve till the slot in it comes round, so that another bracket on frame A, which holds sleeve W'' up to its place long enough to accomplish its object, will pass through a slot in the rim of the sleeve or the sleeve will pass over the bracket and come out of gear. X'', an arm, attached at one end to an arm on sleeve W', and at the other end to shaft K, so that as sleeve W'' turns on shaft E, arm X'' being attached at one end to shaft H'' by pivot, it will be raised and drawn back as arm I, which is attached to shaft H'', turns shaft H'' till the end of arm X'' secured to the shaft shall come under a notch in spring-lever X''', which will hold it in place after the bracket has passed through, or sleeves W' and W'' have passed over the brackets; U''', lever, with which shaft M is turned, that teeth N may throw the bundle over onto the platform after it is bound; B', guards to guide the grain when being raised by the teeth, and to keep the bundle off of the rack Q when being thrown over after being bound; R''', stop, which R'' strikes and is thrown out of gear to stop rack Q from going too far; B'''', eyes in the forward part of the binder to haul it by; C', rack to hold the bundles onto the platform till enough is accumulated for a shock; D', handle with which to handle rack C' whenever it is necessary to dump the grain onto the ground; N'', lifting-stop on shaft K, to raise spring-lever X''' and release arm X; E', spring on shaft H''; F', spring on shaft K; G', driver's seat; Z' plates, standing up and secured to the frame, their lower ends made of separate pieces and hung on the upper pieces by pivots, so that they may slide up and down as they pass over uneven ground, their upper ends nearer together than their lower ends, so as to even the grain as it is gathered up to be bound; Z'', a couple of teeth projecting down from the front end of the binder to keep the grain back and guide it as the teeth L bring it up; L''', wheels under the forward part of the binder, and run even with the front ends of the teeth F, and keeps them from being troubled by uneven ground.

Hitch the team to the machine, the horse or horses traveling by the butts of the grain; and as the machine is hauled along the teeth F gather up the grain, the plates Z' being adjustable and hanging just low enough to touch the ground, shove the butts of the grain up even, and also even the grain as it is raised up, the upper end of these plates being nearer together or in a spiral form, and when grain enough for a bundle is gathered the driver, sitting on the seat, takes hold of lever W and with it throws up lever Y against sleeve W'', and W'' is thrown over against collar N''' on shaft E, and there being teeth on the sleeve and on the collar they are meshed together, and as the shaft E revolves the sleeve W'' revolves with it, and as it revolves the arm on the sleeve is raised and throws arm I attached to it and an arm on shaft H'' forward and turns shaft H'', and brings teeth H up and takes the grain from teeth F, and at the same time shaft H'' brings forward arm X, which is attached to shaft H'' by a pivot, till the end of arm X strikes under a notch in spring-lever X''', which holds shaft H'' in that position. The sleeve W'' having passed round till the bracket on frame A comes to a slot in the sleeve W'', when the sleeve slips over the bracket and out of gear; at the same time the beveled end of X straddling shaft E by being forced forward, its back side against the bracket-collar, through which shaft E works, and the beveled side of X forces sleeve W' against stop V''' on shaft E, and which meshes the teeth of V''' and sleeve W' together, and as the shaft E turns sleeve W' revolves with it, and the arm raises arm X'', which, connected with arm on shaft K, revolves K, and teeth L raises and takes the grain on them, while one of the teeth L strikes a stop which throws pinion-shifter on pinion R′ and throws it into gear, and runs up rack Q, while the tooth L is held up by a spring-stop, and a bracket on shaft K strikes lever X‴, and shaft H″ and arm X fall back to their original positions. The grain on teeth L having raised the wire which was stretched across from twister-jaws to K′ in the ratchet-frame, the pinion R′ passing round sends up rack Q under the grain, carrying the wire round the bundle and up into the twister-jaws M′, the spring Q′ catching and holding the ratchet up to its place, when knife N″″ is sprung up by spring U, P″ being struck by the end of rack Q, and cuts the wire between the knife-blade and stop Y″, and at the same time closes and holds the jaws M′ together; then the driver puts his foot on treadle Z and turns shaft Y by bringing it down, and pulling on cord turns twister-shaft S which turns the twister-jaws M′, which twists the wire. Jaws O′ are forced astride of the wire below jaws M′ and holds the wire, the end of the wire being forced through back of jaws O′ and released after jaws M′ have seized it and held it while being twisted after the knife has cut the wire; when teeth L are turned up to hold the grain, one of them strikes a spring-stop which throws the pinion R′ into gear, and it runs up the rack till it strikes a stop, R‴, when it is thrown out of gear, and the rack, when released from the stop S′ by the bracket on one of the teeth L as it passes back, is thrown back to its original position by spring P′, and the machine is ready to take up and bind another bundle. The bundle, after it is bound, is thrown over guards B′ and falls onto the platform before the ratchet Q is thrown back to its original position.

I claim as my invention—

1. Teeth F and shaft G hinged to frame A, shaft H″ and teeth H, shaft K, teeth L, shaft M, teeth N, and lever U′, arranged substantially as described.

2. Forked piece O, piece K′, spiral spring P, rack Q, pinion R′, shaft S, spool T, shaft Y, treadle Z, tension-wheel A″, twisting-jaws M′, lever U, knife N″″, spring-jaws O′, block Y″, spring Q′, and spring S, forming a twisting device, arranged substantially as and for the purpose set forth.

3. Frame A, wheels B, rim C, pinion D, shaft E, lever X‴, bracket V″, sleeve W′, arm X, lever W, lever Y, sleeve W″, collar V‴, arm I, sleeve W‴, and shaft H″, arranged substantially as described.

4. Adjustable plates Z′, guards B′, in combination with frame A, substantially as described.

5. Shaft E, standard R, pinion R′, shifter R″, in combination with rack Q, substantially as described.

MOSES T. RIDOUT.

Witnesses:
J. B. SMITH,
CHAS. A. SMITH. (74)